(No Model.)
R. C. SMITH.
NUT LOCK.
No. 260,249. Patented June 27, 1882.
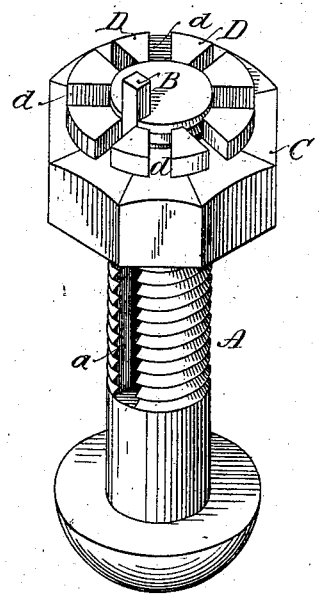
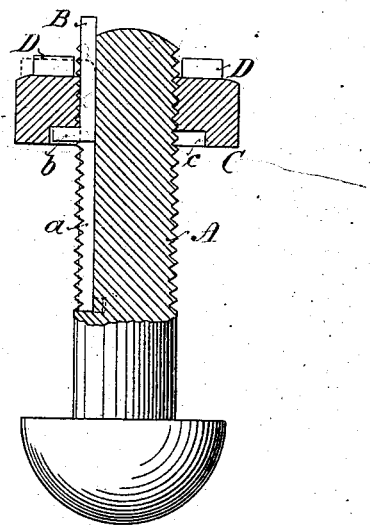
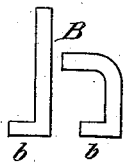
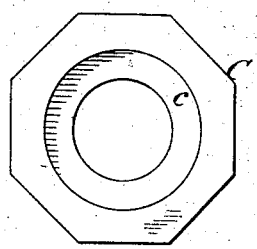
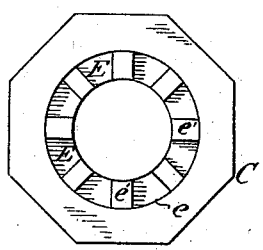
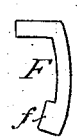
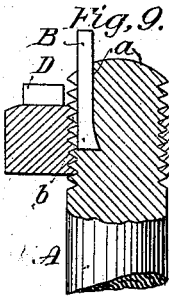
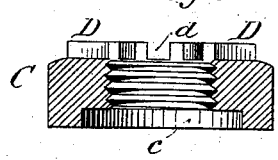
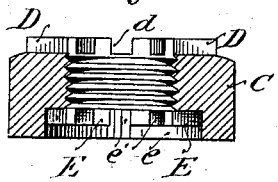
WITNESSES
Wm A. Skinkle
Ernest Abshagen
INVENTOR
Richards C. Smith,
By his Attorneys
Baldwin, Hopkins & Peyton

UNITED STATES PATENT OFFICE.

RICHARDS C. SMITH, OF BALTIMORE, MARYLAND.

NUT-LOCK.

SPECIFICATION forming part of Letters Patent No. 260,249, dated June 27, 1882.

Application filed March 8, 1882. (No model.)

*To all whom it may concern:*

Be it known that I, RICHARDS C. SMITH, of the city of Baltimore, in the State of Maryland, have invented certain new and useful Improvements in Nut-Locks, of which the following is a specification.

My invention relates to improvements in that class of nut-locks in which are employed longitudinally-grooved bolts with locking pins or keys engaging said grooves and notches or recesses in the nuts.

My improvements will hereinafter be distinctly claimed.

In the accompanying drawings, by the aid of which my improvements will be particularly pointed out, Figure 1 is a view in perspective of a bolt and nut with a locking-pin in position and ready to be locked by bending its outer end. Fig. 2 is a view, partly in elevation and partly in longitudinal central section, of the devices represented in Fig. 1, the outer end of the pin being represented by dotted lines as bent or headed and locked to the nut. Fig. 3 represents the locking-pin both in its unbent and bent or locked conditions. Fig. 4 is a plan view showing the inner recessed and shouldered or annularly grooved face of the nut. Fig. 5 is a central sectional view of the nut. Fig. 6 is a plan view, showing the inner face of a nut of modified construction; Fig. 7, a central sectional view of the modified form of nut; Fig. 8, a view showing a modification of the locking-key; and Fig. 9, a sectional view, showing another modification, the bolt-groove being made of such length that when the nut is screwed home it will in part engage the ungrooved portion of the bolt-thread.

A suitable screw-bolt, A, is provided with a longitudinal groove, *a*, as usual. A locking-pin or fastening-key, B, of suitable metal, is fitted lengthwise in the groove *a*.

The nut C is provided on its outer face with a series of radial recesses or notches, *d*, into one of which recesses the projecting or outer end of the locking-pin is forced by bending it when the nut is screwed home. Instead of forming these locking-recesses in the body or face proper of the nut, they are shown as formed between shoulders D offset from the face of the nut, the metal provided to form said shoulders being in addition to that constituting the nut proper. In this way the nut is not weakened, as it would be by the formation of the locking-recesses by sinking them in the face or metal of the nut proper; and as the alternate offset shoulders D and recesses *d* are quite short, extending neither to the tap-hole of the nut nor to its periphery, but slight additional material is required to provide them. As the locking-recesses do not reach to or terminate in the tap of the nut, the continuity of the thread of the nut is unbroken. The nut C is shown as formed with a shouldered cavity or annular recess, *c*, on its inner face to receive the inner bent end or shoulder *b* of the locking-pin and allow of the nut being turned freely in screwing it upon the bolt with the pin in place. The recess *c* entirely surrounds the tap of the nut and terminates in it, as clearly shown by the drawings.

From the above description it will be understood that in operation the pin is adjusted in the bolt-groove, the nut screwed home, and the pin bent at its outer end, as represented in dotted lines in Fig. 2, thus securely locking the bolt and nut together.

Instead of recessing the nut on its inner face and using the short locking-pin B, the recess *c* may be omitted, and a long locking-pin may be employed to engage by its head or shouldered end a recess in the bolt at the lower end of its groove *a*, as shown by dotted lines in Fig. 2. In Fig. 9 a short pin is shown in a short groove in the bolt, the shoulder or head *b* of the pin engaging a recess at the bottom of the groove *a* at such a point that the nut will in part be secured on the ungrooved portion of the bolt, thus securing greater strength than when the groove *a* extends through the entire length of the bolt-thread engaged by the nut. With such modified forms of nuts and pins there would still be retained the advantages of my offset locking-lugs and recesses. I prefer, however, to use the annularly-recessed nut.

Figs. 6 and 7 represent a modified form of nut adapted to be locked with the locking-pin at both faces. The annular recess in the inner face of this nut is made of a depth equal to about twice the thickness of the bent end or shoulder *b* of the pin B. That portion *e* of the recess extending from the face of the nut inward for about half the depth of the recess is unobstructed, as in Fig. 2, while the remaining part of this recess is provided with locking-shoulders E, forming locking-recesses $e'$. In using this form of nut the pin B is adjusted and the nut screwed up, as before explained. The pin is then moved endwise to draw its shoulder from the plain recess $e$ into one of the notches $e'$, and is then bent over at its outer end. To prevent accidental engagement of the pin-shoulder $b$ with the notches $e$ when the nut end of the bolt projects downward, this shoulder is slightly swelled or made large enough to require some force to move it into engagement with the locking-recesses.

Fig. 8 represents a modification of the locking-pin for doubly locking the nut shown in Figs. 6 and 7, or for use in connection with the preferred form of nut shown in Figs. 1 and 2. This pin F is made of spring metal, is slightly curved lengthwise, and is provided with the elongated head or side enlargement, $f$, at its inner end. The key may readily be driven in place after the nut is screwed home. When the inner end or head, $f$, of the key is brought into proper position it springs into engagement with one of the radial locking-recesses $e'$. Its outer end is then turned over into a notch on the outer face of the nut, which is diametrically in line with the recess $e'$ engaged by the key-head.

Obviously the spring-key F may be employed in connection with a nut having the recess $c$, as in Fig. 2, provided the recess is made deep enough to receive the key-head.

The nuts may be made by means of suitable dies adapted to form the alternate locking recesses and shoulders offset from their outer faces, and the annular recesses, with or without the shoulders, in their opposite faces, and afterward be tapped with unbroken threads.

I do not broadly claim a nut having locking-recesses, nor broadly a nut having an annular recess around the tap-hole. Neither do I claim broadly either a grooved bolt or the combination of such bolt, a locking-key, and a nut having recesses into any one of which the locking-key may be bent, as I am aware that, unqualifiedly considered, such constructions and combination are older than my invention.

I claim as of my own invention—

1. The nut constructed with the described alternate recesses $d$ and shoulders D offset from its face, and extending neither to the tap nor to the periphery, for engagement by the bent outer end of the locking-pin, as set forth.

2. A nut provided on its outer face with recesses for the locking-pin, and having in its inner face an annular recess surrounding and terminating in the tap for the head of the locking-pin, substantially as set forth.

3. The combination of the bolt having the longitudinal side groove, the locking-pin fitted lengthwise in said groove, and the nut provided with the alternate recesses $d$ and shoulders D offset from its face, and extending neither to the tap nor to the periphery, as and for the purpose set forth.

4. The combination of the grooved bolt, the locking-pin, and the nut having the annular recess on its inner face, and provided with a series of recesses on its outer face for engagement by the locking-pin, substantially as set forth.

5. The nut having the annular recess and locking-notches $e'$ on its inner face, substantially as and for the purpose hereinbefore set forth.

6. The nut provided with locking-pin notches on its outer face, and having the annular recess provided with locking-notches on its opposite face, substantially as and for the purpose set forth.

7. The combination, substantially as hereinbefore set forth, of the grooved bolt, the locking-pin, and the nut provided with the annular recess and locking-pin notches on its inner face.

8. The combination of the grooved bolt, the locking-pin, and the nut having the locking-notches on its outer face and the annular recess and locking-notches on its inner face, substantially as and for the purpose set forth.

In testimony whereof I have hereunto subscribed my name.

RICHARDS C. SMITH.

Witnesses:
GEO. McCAFFRAY,
S. A. MORSE.